United States Patent
Park et al.

(10) Patent No.: US 10,412,731 B2
(45) Date of Patent: Sep. 10, 2019

(54) METHODS FOR TRANSMITTING AND RECEIVING UPLINK DATA AND APPARATUSES THEREOF

(71) Applicant: KT CORPORATION, Gyeonggi-do (KR)

(72) Inventors: Kyujin Park, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 15/497,362

(22) Filed: Apr. 26, 2017

(65) Prior Publication Data

US 2017/0318580 A1 Nov. 2, 2017

(51) Int. Cl.
*H04W 72/04* (2009.01)
*H04W 16/14* (2009.01)
*H04W 84/04* (2009.01)

(52) U.S. Cl.
CPC ....... *H04W 72/0446* (2013.01); *H04W 16/14* (2013.01); *H04W 72/042* (2013.01); *H04W 84/042* (2013.01)

(58) Field of Classification Search
None
See application file for complete search history.

(56) References Cited

U.S. PATENT DOCUMENTS

| 2011/0249584 | A1* | 10/2011 | Barbieri | H04L 1/0026 370/252 |
| 2015/0245376 | A1* | 8/2015 | Bashar | H04L 1/18 370/277 |
| 2015/0312775 | A1* | 10/2015 | Yi | H04W 16/00 370/254 |
| 2016/0135143 | A1* | 5/2016 | Won | H04W 72/005 370/312 |

OTHER PUBLICATIONS

Nokia Networks, "UL LBT and Configurable Frame Structure for UL/DL operation", R1-152817, 3GPP TSG RAN WG1 Meeting #81, Fukuoka, Japan, May 25-29, 2015, pp. 1-5.
3GPP TS 36.213 V12.8.0, Jan. 6, 2016.

* cited by examiner

*Primary Examiner* — Jamaal Henson
(74) *Attorney, Agent, or Firm* — IP Legal Services, LLC

(57) ABSTRACT

The present disclosure relates to a method and an apparatus for uplink data scheduling of a cell using an unlicensed spectrum. The method may include configuring carrier aggregation including a secondary cell (SCell) using an unlicensed spectrum, receiving downlink control information including subframe allocation information for transmitting uplink data in the secondary cell from a base station, and transmitting the uplink data through a plurality of consecutive subframes based on the subframe allocation information.

12 Claims, 12 Drawing Sheets

Cross-carrier scheduling
(carrier indication included in DCI)

FIG. 4

| size (size) | Uplink grant (Uplink grant) | | Usage (Usage) | |
| --- | --- | --- | --- | --- |
| | | | Downlink Assignment (Downlink Assignment) | Power Control (Power Control) |
| small (small) | - | 1C | Special purpose compact assignment (Special purpose compact assignment) | - |
| | 0 single layer (single layer) | 1A | Continuous allocations only (Continuous allocations only) | 3, 3A |
| | - | 1B | Codebook-based beam-forming using CRS (Codebook-based beam-forming using CRS) | - |
| | - | 1D | Multi-user MIMO using CRS (Multi-user MIMO using CRS) | - |
| | 4 spatial multiplexing (spatial multiplexing) | - | - | - |
| | - | 1 | Flexible allocations (Flexible allocations) | - |
| | - | 2A | Open-loop spatial multiplexing using CRS (Open-loop spatial multiplexing using CRS) | - |
| | - | 2B | Dual-layer transmission using DM-RS (Dual-layer transmission using DM-RS) | - |
| | - | 2C | Multi-layer transmission using DM-RS (Multi-layer transmission using DM-RS) | - |
| Large (Large) | - | 2 | Closed-loop spatial multiplexing using CRS (Closed-loop spatial multiplexing using CRS) | - |

FIG.5

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | 4 |
| 1 | | 6 | | 4 | | | 6 | | 4 | |
| 2 | 4 | | | | | 4 | | | 4 | 4 |
| 3 | 4 | | | 4 | 4 | 4 | | | 4 | 4 |
| 4 | | | | | | | | | 4 | 4 |
| 5 | 7 | | | | | | | | 4 | |
| 6 | 7 | 7 | | | | 7 | 7 | | 7 | 5 |

FIG.8

| Subframe offset | O |
|---|---|
| 0000 | 0 |
| 0001 | 1 |
| 0010 | 2 |
| 0011 | 3 |
| 0100 | 4 |
| 0101 | 5 |
| 0110 | 6 |
| 0111 | 7 |
| 1000 | 8 |
| 1001 | 9 |
| 1010 | 10 |
| 1011 | 11 |
| 1100 | 12 |
| 1101 | 13 |
| 1110 | 14 |
| 1111 | 15 |

FIG.9

| Subframe allocation information | Subframe offset, O | Duration, k |
|---|---|---|
| 0 | 0 | 4 |
| 1 | 0 | 3 |
| 2 | 1 | 3 |
| 3 | 0 | 2 |
| 4 | 1 | 2 |
| 5 | 2 | 2 |
| 6 | 1 | 1 |
| 7 | 2 | 1 |

METHODS FOR TRANSMITTING AND RECEIVING UPLINK DATA AND APPARATUSES THEREOF

CROSS-REFERENCE TO RELATED APPLICATION

This application claims priority from Korean Patent Application No. 10-2016-0051737 filed on Apr. 27, 2016 and No. 10-2016-0171232 filed on Dec. 15, 2016, which are hereby incorporated by reference for all purposes as if fully set forth herein.

BACKGROUND

1. Field of the Disclosure

The present disclosure relates to a method and an apparatus for supporting RAT (Radio Access Technology) based on long term evolution (LTE) or LTE-Advanced in an unlicensed spectrum. More specifically, the present disclosure relates to a method and an apparatus for scheduling uplink data of a cell using an unlicensed spectrum.

2. Description of the Related Art

Due to advance in a communication system, various types of wireless user equipments have been introduced to consumers as individuals and companies. A mobile communication system supporting LTE (Long Term Evolution), LTE-Advanced of third generation partnership project (3GPP) is a communication system capable of transmitting a large amount of data at a high speed. In order to further improve capabilities of a communication system, a data transmission technology using a plurality of cells or small cell deployments has been introduced. Further, carrier aggregation may be applied to various deployment scenarios.

Meanwhile, a carrier aggregation technology is a technology to evolve a data transmittance and reception rate by aggregating one more component carriers and transmitting and receiving data there through. Such carrier aggregation increases available frequencies in perspective view of user equipment and enables processing a massive amount of data at a high speed therethrough.

A frequency for a mobile communication network is limited, and the number of mobile communication subscribers has been abruptly increasing. Accordingly, there is a limitation to improve a data transmittance and reception rate and a capacity of processing a massive amount of data. To solve this, carrier aggregation using an unlicensed spectrum has been introduced.

There is a problem of excessively performing unnecessary LBT (Listen Before Talk) operations to transmit and receive uplink data since an unlicensed spectrum needs an coexistence with other RAT.

SUMMARY

In above-mentioned background, one embodiment is to provide a method and an apparatus for enabling a user equipment to transmit uplink data with minimizing LBT operations when the user equipment is performing a communication with a carrier aggregation of an unlicensed spectrum.

Also, one embodiment is to propose a specific procedure and method for transmitting and receiving uplink data in a plurality of subframe using downlink control information.

In accordance with an embodiment of the present disclosure, a method may be provided for transmitting uplink data by a user equipment. The method may include configuring carrier aggregation including a secondary cell which is using an unlicensed spectrum, receiving downlink control information including subframe allocation information for transmitting uplink data in the secondary cell from a base station, and transmitting the uplink data through a plurality of consecutive subframes of the secondary cell based on the subframe allocation information.

In accordance with another embodiment, a method may be provided for receiving uplink data by a base station. The method may include controlling carrier aggregation configuration of a user equipment including a secondary cell which is using an unlicensed spectrum, transmitting downlink control information including subframe allocation information for transmitting uplink data in the secondary cell, and receiving the uplink data transmitted through a plurality of consecutive subframes of the secondary cell based on the subframe allocation information.

In accordance with still another embodiment, a user equipment may be provided for transmitting uplink data. The user equipment may include a controller configured to configure a carrier aggregation including a secondary cell which is using an unlicensed spectrum, a receiver configured to receive downlink control information including subframe allocation information for transmitting a uplink data in the secondary cell from a base station, and a transmitter configured to transmit the uplink data through a plurality of consecutive subframes of the secondary cell based on the subframe allocation information.

In accordance with yet another embodiment, a base station may be provided for receiving uplink data. The base station may include a controller configured to control a carrier aggregation configuration of a user equipment including a secondary cell which is using an unlicensed spectrum, a transmitter configured to transmit downlink control information including subframe allocation information for transmitting a uplink data in the secondary cell, and a receiver configured to receive the uplink data transmitted through a plurality of consecutive subframes of the secondary cell based on the subframe allocation information.

In accordance with the embodiments, a specific procedure may be provided for transmitting uplink data of a user equipment which constitutes a carrier aggregation using a cell of an unlicensed spectrum.

In accordance with the embodiments, unnecessary operations of user equipment may be prevented when transmitting uplink data using a cell of an unlicensed spectrum. Further, it is possible to transmit uplink data stably.

BRIEF DESCRIPTION OF THE DRAWINGS

The above and other objects, features, and advantages of the present disclosure will be more apparent from the following detailed description taken in conjunction with the accompanying drawings, in which:

FIG. 4 is a diagram for explaining a format of downlink control information.

FIG. 5 is a diagram for explaining a timing of uplink data transmission in case a duplex mode of a user equipment is time division duplex (TDD).

FIG. 8 is an exemplary diagram illustrating subframe offset information according to one embodiment.

FIG. 9 is a diagram illustrating one example of a subframe allocation set.

DETAILED DESCRIPTION OF THE EXEMPLARY EMBODIMENTS

Figure 1:
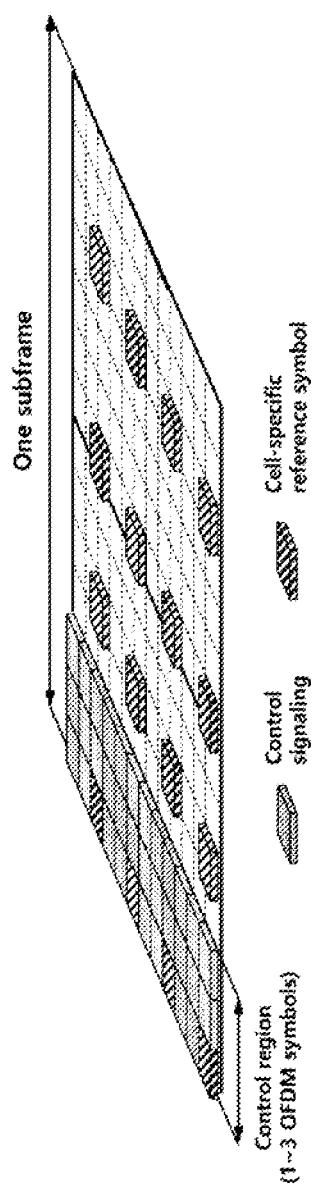
FIG. 1 is a diagram for exemplary illustrating an orthogonal frequency division multiplexing (OFDM) symbol for transmitting a control signal in one subframe.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

The wireless communication system may be widely installed to provide various communication services, such as a voice service, a packet data service, and the like. The wireless communication system may include a User Equipment (UE) and a Base Station (BS or an eNB). Throughout the specifications, the user equipment may be an inclusive concept indicating a user terminal utilized in wireless communication, including a UE (User Equipment) in wideband code division multiple access (WCDMA), LTE, high speed packet access (HSPA), and the like. Further, the user equipment may indicate an MS (Mobile station), a UT (User Terminal), an SS (Subscriber Station), a wireless device, and the like in global systems for mobile communication (GSM).

A base station or a cell may generally refer to a station performing communication with a User Equipment (UE). The base station or the cell may also be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

That is, the base station or the cell may be construed as an inclusive concept indicating a portion of an area covered by a BSC (Base Station Controller) in CDMA, a NodeB in WCDMA, an eNB or a sector (site) in LTE, and the like, and the concept may include various coverage areas, such as a megacell, a macrocell, a microcell, a picocell, a femtocell, a communication range of a relay node, and the like.

Each of the above mentioned various cells has a base station that controls a corresponding cell, and thus, the base station may be construed in two ways. (i) The base station may be a device itself that provides a megacell, a macrocell, a microcell, a picocell, a femtocell, and a small cell in association with a wireless area, or (ii) the base station may indicate a wireless area itself (e.g., cell). In (i), the base station may indicate all devices that provide and configure a predetermined wireless area by cooperatively interacting with others or by being controlled by an identical entity. Based on a configuration type of a wireless area, base station may be indicated as an eNB, an RRH, an antenna, an RU, a Low Power Node (LPN), a point, a transmission/reception point, a transmission point, a reception point, and the like. In (ii), a base station may be indicated as wireless area itself that receives a signal from or transmits a signal to a terminal or a neighboring base station.

Therefore, a base station may be referred to as megacell, a macrocell, a microcell, a picocell, a femtocell, a small cell, an RRH, an antenna, an RU, an LPN, a point, an eNB, a transmission/reception point, a transmission point, and a reception point.

In the specifications, the user equipment and the base station are used as two inclusive transceiving subjects to embody the technology and technical concepts described in the specifications. The user equipment and the base station may not be limited to a predetermined term or word. Here, Uplink (UL) refers to a scheme for data transmission and reception from a UE to a base station, and Downlink (DL) refers to a scheme for data transmission and reception from a base station a UE.

Various multiple access schemes may be unrestrictedly applied to the wireless communication system. Various multiple access schemes may include CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like. Embodiments of the present disclosure may be applicable to resource allocation in an asynchronous wireless communication scheme that has been advanced through GSM, WCDMA, and HSPA, to be LTE and LTE-advanced. The embodiments may be applicable to resource allocation in a synchronous wireless communication scheme that has been advanced through CDMA and CDMA-2000, to be UMB. However, embodiments of the present disclosure may not be limited to a specific wireless communication field and may include all technical fields in which the technical idea of the present disclosure is applicable.

Uplink transmission and downlink transmission may be performed based on a TDD (Time Division Duplex) scheme that performs transmission based on different times or based on an FDD (Frequency Division Duplex) scheme that performs transmission based on different frequencies.

Further, in a system such as LTE and LTE-Advanced, a standard may be developed by configuring an uplink and a downlink based on a single carrier or a pair of carriers. The uplink and the downlink may transmit control information through a control channel, such as a PDCCH (Physical Downlink Control CHannel), a PCFICH (Physical Control Format Indicator CHannel), a PHICH (Physical Hybrid ARQ Indicator CHannel), a PUCCH (Physical Uplink Control CHannel), an EPDCCH (Enhanced Physical Downlink Control CHannel), and the like, and may be configured as a data channel, such as a PDSCH (Physical Downlink Shared CHannel), a PUSCH (Physical Uplink Shared CHannel), and the like, to transmit data.

On the other hand, control information may be transmitted using an EPDCCH (enhanced PDCCH or extended PDCCH).

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system according to embodiments refers to a Coordinated Multi-point transmission/reception (CoMP) system, a coordinated multi-antenna transmission system, or a coordinated multi-cell communication system, where two or more transmission/reception points cooperatively transmit a signal. A CoMP system may include at least two multi-transmission/reception points and terminals.

A multi-transmission/reception point may include a base station or a macro cell (hereinafter, referred to as an 'eNB') and at least one RRH. The at least one RRH is connected to the eNB through an optical cable or an optical fiber, is wiredly controlled, and has a high transmission power or a low transmission power within a macro cell area.

Hereinafter, a downlink refers to communication or a communication path from a multi-transmission/reception point to a terminal, and an uplink refers to communication or a communication path from a terminal to a multi-transmission/reception point. In a downlink, a transmitter may be a part of a multiple transmission/reception point and a receiver may be a part of a terminal. In an uplink, a transmitter may be a part of a terminal and a receiver may be a part of a multiple transmission/reception point.

Hereinafter, the situation in which a signal is transmitted and received through a PUCCH, a PUSCH, a PDCCH, a PDSCH, or the like may be described through the expression, "a PUCCH, a PUSCH, a PDCCH, or a PDSCH is transmitted or received".

In addition, hereinafter, the expression "a PDCCH is transmitted or received, or a signal is transmitted or received through a PDCCH" includes "an EPDCCH is transmitted or received, or a signal is transmitted or received through an EPDCCH".

That is, a physical downlink control channel used herein may indicate a PDCCH or an EPDCCH. The physical downlink control channel may also indicate a meaning including both a PDCCH and an EPDCCH.

In addition, for ease of description, an EPDCCH may be applied to embodiments described using a PDCCH and to embodiments described using an EPDCCH.

Meanwhile, high layer signaling includes RRC signaling that transmits RRC information including an RRC parameter in the specification.

An eNB executes downlink transmission to terminals. The eNB may transmit a Physical Downlink Shared Channel (PDSCH) which is a primary physical channel for unicast transmission. The eNB may also transmit a Physical Downlink Control Channel (PDCCH) for transmitting downlink control information, such as scheduling required for reception of a PDSCH, and scheduling grant information for transmission of uplink data channel (for example, a Physical Uplink Shared Channel (PUSCH)). Hereinafter, transmission and reception of a signal through each channel will be described as transmission and reception of a corresponding channel.

As introduction of a carrier aggregation technology, a wireless resource for an uplink or a downlink data transmission through a plurality of carriers or serving cells may be allocated to one user equipment. Therefore, a data transmission speed may be improved as compared to existing communication means which is operating in a single carrier or a single serving cell.

As supporting a carrier aggregation technology, in case of a user equipment capable of a carrier aggregation belonging to a coverage of a base station supporting a carrier aggregation, the user equipment may perform SCell (Secondary Cell) addition/release procedure through RRC connection reconfiguration procedure besides a primary cell connected through primary RRC connection/configuration procedure with a corresponding base station. In addition, a user equipment capable of a carrier aggregation may aggregate and use at most 5 CC (component Carrier) or serving cell additionally by SCell activation/deactivation procedure through MAC CE (Control Element) signaling. In the present specification, it is described to aggregate a serving cell for convenience and ease of understanding, but it may be applied similarly in a case of aggregating CC.

Meanwhile, a carrier aggregation in the present specification relates to an operation of a user equipment and a base station when a SCell constitutes a cell using an unlicensed spectrum. That is, when a user equipment constitutes a carrier aggregation, it may constitute the carrier aggregation by adding one more cell using an unlicensed spectrum as a SCell. The unlicensed spectrum means non-exclusive frequency spectrum not a frequency spectrum used exclusively by a certain operator, means a spectrum which may be used by a plurality of operators like WiFi. Therefore, for transmitting and receiving a data using an unlicensed spectrum, it is required to confirm whether a wireless resource of an unlicensed spectrum is used for a coexistence with a user equipment using other RAT (Radio Access Technology) like WiFi and to perform a LBT operation for starting.

FIG. 1 is a diagram exemplary illustrating an orthogonal frequency division multiplexing (OFDM) symbol transmitting a control signal in one subframe.

Referring to FIG. 1, a control region includes transmission of PHICH, PCFICH, PDCCH. Here, a PDCCH is allocated uniformly within a region in the number of OFDM symbols transmitting a PDCCH indicated by a PCFICH except a resource used by a PHICH and a PCFICH and transmitted.

Figure 2:
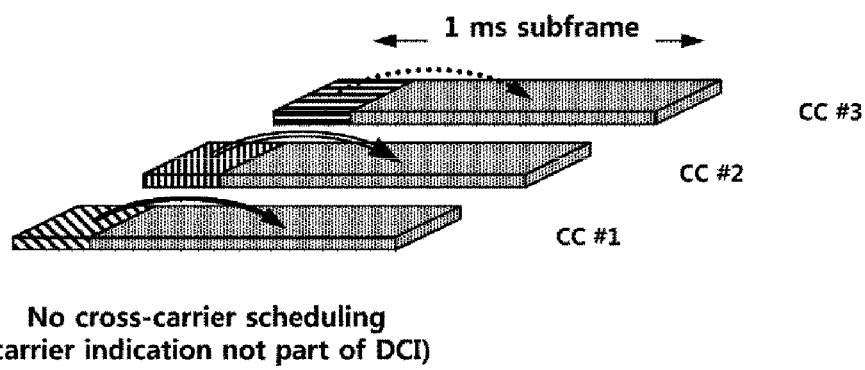
FIG. 2 is a diagram for explaining a self-carrier scheduling on multiple carriers.
Figure 3:
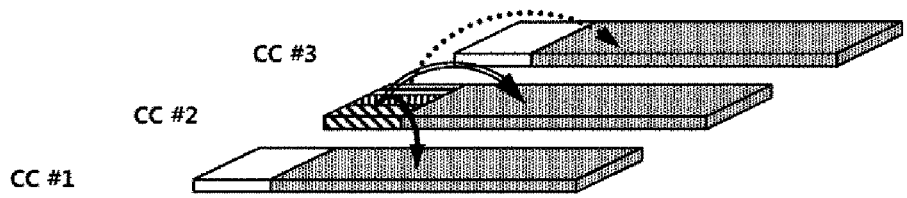
FIG. 3 is a diagram for explaining a cross carrier scheduling on multiple carriers.

FIG. 2 is a diagram for explaining a self-carrier scheduling in multiple carriers, and FIG. 3 is a diagram for explaining a cross carrier scheduling in multiple carriers.

Referring to FIG. 2, when a PDSCH is transmitted in multiple carriers, transmission of a PDSCH indicated by a control channel transmitted in every subframe may be checked. FIG. 2 is a diagram showing a self-carrier scheduling operation in multiple carriers, a PDSCH is scheduled in each carrier independently. For example, a PDCCH exists in each carrier separately, and a PDCCH of each carrier schedules a PDSCH of a corresponding carrier. That is, a data transmission of each carrier is performed by a control channel transmitted in every subframe in 1 ms subframe.

FIG. 3 is a diagram showing a cross carrier scheduling operation in multiple carriers. The diagram shows the cross-carrier scheduling when it is configured to schedule a PDSCH to a plurality of carriers in one carrier. For example, a PDCCH existing in one carrier may schedule a PDSCH capable of transmitting in a plurality of carriers. In a case of FIG. 3, likewise FIG. 2, data transmission in multiple carriers is performed by a control channel transmitted in every subframe in 1 ms subframe.

FIG. 4 is a diagram for explaining downlink control information format.

Referring to FIG. 4, the diagram shows downlink control information (DCI) format which indicates a scheduling grant for a transmission of an uplink or a downlink. A DCI format is divided and transmitted according to each uplink or downlink transmission method and usage.

<Access Using LTE Communication Technology in an Unlicensed Spectrum (Licensed Assisted Access Using LTE in Unlicensed Spectrum)>

Mobile communication business operators of each country constitute a wireless cell by using a frequency of a licensed spectrum allowed from a government exclusively, provide a wireless communication service to a user equipment based on this. Therefore, many studies have been conducted for providing a high spectral efficiency through a technology like MIMO, ICIC, CoMP as a Radio Access Technology (RAT) for using a limited frequency spectrum efficiently. In addition, a research about a carrier aggregation (CA) technology has been performed, which may support more higher data transmission rate by aggregating a plurality of carriers existing in consecutive or non-consecutive frequency band.

As introducing mobile devices having high processing power such as a smart phone and a tablet, an amount of mobile data traffic has been increasing sharply. Therefore, each wireless communication business operators need more frequency resources to support the mobile data traffic. However, a licensed spectrum frequency resource is limited, or there are limitations according to a policy condition of each country.

In order to overcome such limitation, it has been considered to provide a LTE/LTE-Advanced service an using unlicensed spectrum which is used to provide a short distance wireless communication service, such as WiFi and Bluetooth.

However, an unlicensed spectrum is not a wireless channel which may be used exclusively by any business operator like a licensed spectrum. The unlicensed spectrum may be used freely for providing a wireless communication service by a plurality of users including an individual within a regulation of each country.

Therefore, when LTE/LTE-Advanced service is provided through an unlicensed spectrum, it may cause a signal interference and a coexistence problem with other communication system may. For example, when providing a mobile communication service like LTE using an unlicensed spectrum, it may cause a coexistence problem with various a short-distance wireless communication protocol like WiFi, Bluetooth, and NFC. In addition, it may also cause a coexistence problem with other LTE business operators may. Therefore, there is a demand to develop a method to solve these problems.

As one example, when LTE/LTE-Advanced service is provided through an unlicensed spectrum, a wireless channel access scheme based on LBT (Listen Before Talk) may be used. The wireless channel access scheme based on LBT determines whether it is possible to use a corresponding wireless channel or a carrier by sensing a power level of the wireless channel or the carrier to use before transmitting a wireless signal in order to avoid interference or collision among wireless communication services. In this case, when a certain wireless channel or a carrier of a corresponding unlicensed spectrum is used by other wireless communication protocol or other business operator, it is possible to limit to provide a LTE/LTE-Advanced service through a corresponding spectrum. Therefore, when providing LTE/LTE-Advanced service through an unlicensed spectrum, it is not guaranteed a QoS required by a user unlike LTE/LTE-Advanced service through a licensed spectrum.

As describe, an unlicensed spectrum cell may be constituted as a SCell to a user equipment through a carrier aggregation for transmitting and receiving a data stably. For example, there is a research on LAA (Licensed-Assisted Access) technology which constitutes a SCell through an unlicensed spectrum and increases a data transmission rate through a carrier aggregation with a PCell of a licensed spectrum.

However, such a LAA technology only supported a downlink subframe constitution through an unlicensed spectrum. That is, the LAA technology didn't support an uplink subframe through a SCell constituted through an unlicensed spectrum and uplink data transmission according to the uplink subframe. In this situation, it is necessary for developing a carrier aggregation technology based on a limited LAA to extend to uplink data transmission and reception technology through an unlicensed spectrum and to enlarge a data transmission and reception speed and capacity of a user equipment.

When transmitting uplink data through an unlicensed spectrum, a channel preoccupancy competitiveness for a data transmission may be decreased comparing to other RAT (for example, WiFi) using an unlicensed spectrum because it is necessary to simultaneously perform a LBT of a base station for transmitting UL grant and a LBT of a user equipment for transmitting a PUSCH, as compared to a downlink transmission where a LBT is performed only in a base station.

In order to overcome, a multi-subframe scheduling method may be considered. The multi-subframe scheduling method performs a plurality of PUSCH transmission resource allocations through a plurality of uplink subframe by one UL grant.

Hereinafter, when a user equipment constitutes a carrier aggregation including an unlicensed spectrum cell, the unlicensed spectrum cell will be described as a secondary cell or LAA Scell using an unlicensed spectrum, but the embodiments of the present disclosure are not limited thereto.

For transmitting uplink data in LAA SCell, a PUSCH resource of LAA SCell need to be scheduled by a base station. In this case, for suppressing the above-mentioned LBT problem, a PUSCH resource scheduled in units of one subframe may be extended to be scheduled in units of a plurality of subframes.

For example, a typical UL grant DCI format including a PUSCH transmission resource allocation information for transmitting one TB (Transport Block) or two TBs per subframe is extended for a PUSCH resource allocation in any LAA SCell, and it may be defined UL grant DCI format(s) to transmit information on k PUSCH transmission resource allocations for transmitting one or two TB per a corresponding subframe through k uplink subframe (only, k≤N). Here, N is the number of maximum uplink subframe which may be allocated through multi subframe scheduling for a corresponding user equipment, and may be configured by a base station or as any fixed value. N is a natural number greater than or equal to 1.

Meanwhile, according to a typical uplink data scheduling method, there is any fixed timing relation between i) a subframe that transmits UL grant through a downlink control channel including a resource allocation information for a PUSCH transmission of a user equipment and ii) a uplink subframe that performs a PUSCH transmission. When a user equipment operates in a cell based on frame structure type 1 which is FDD duplex mode and receives UL grant through a PDCCH or an EPDCCH transmitted in a subframe #n, a corresponding user equipment is configured to transmit a PUSCH through uplink subframe #(n+4). In addition, when a user equipment operates in a cell based on frame structure type 2 which is TDD duplex mode and receives UL grant through a PDCCH or an EPDCCH transmitted in a subframe n, a corresponding user equipment is configured to transmit a PUSCH through uplink subframe #(n+m). Only, in this case, m is configured like FIG. 5 according to TDD UL/DL configuration.

But, as proposed in the present specification, when multi subframe scheduling is applied for a PUSCH transmission through LAA SCell, a PUSCH transmission resource allocation is performed through k uplink subframes by one UL grant, it is necessary to define a timing relation of k uplink subframes performing a corresponding PUSCH transmission additionally. That is, a user equipment receiving downlink control information including a scheduling information for a uplink data transmission needs to check information about a subframe index for a corresponding uplink data transmission.

Therefore, hereinafter, it is described a specific embodiment to notice information related to k uplink subframe timing performing a corresponding PUSCH transmission to a user equipment, when the user equipment constituting a carrier aggregation including an unlicensed spectrum SCell performs uplink data transmission through a plurality of subframes.

Above-mentioned, it is defined UL grant DCI format (below, referred to as MSF (Multi-subframe Scheduling Format)) for multi-subframe scheduling to schedule a PUSCH transmission resource to a plurality of subframes by one downlink control information. In this case, a PUSCH transmission resource allocation may be performed through arbitrary k uplink subframes (only, k≤N) through a corresponding MSF, it is described a specific method to indicate to a user equipment by constituting k uplink subframes. Only, above-mentioned, N value which is the number of maximum subframe capable of being scheduled through a single MSF is configured by a base station, or has an arbitrary fixed value, and in the present embodiments, it is proposed a method for allocating corresponding k(≤N) uplink subframes performing a real PUSCH resource allocation regardless of a method for defining a specific N value.

Figure 6:
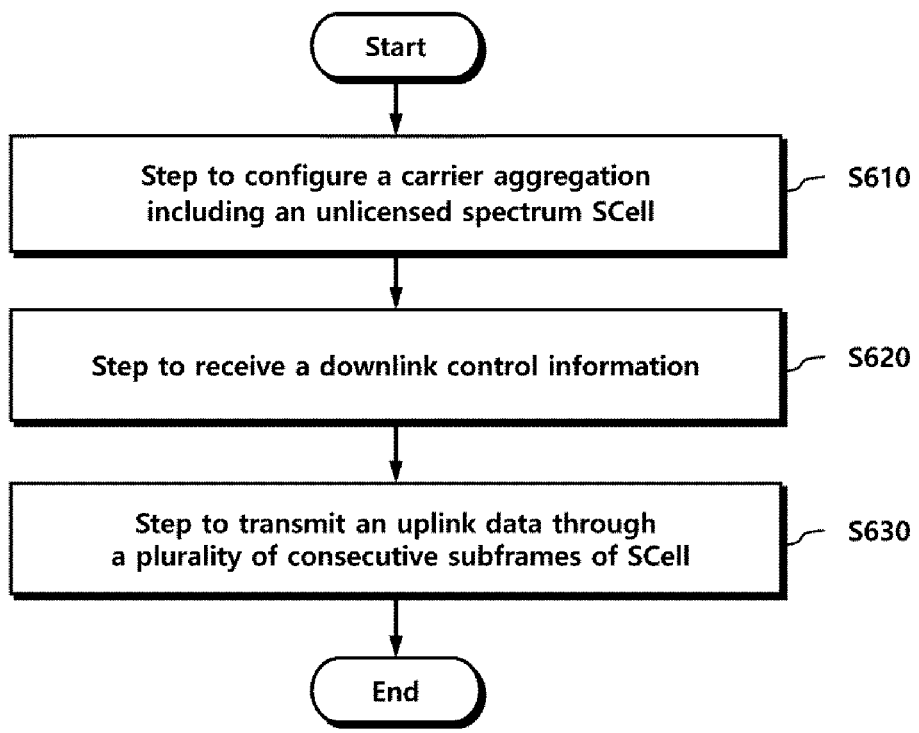
FIG. 6 is a diagram for explaining an operation of a user equipment according to one embodiment.

FIG. 6 is a diagram for explaining operations of a user equipment according to one embodiment.

Referring to FIG. 6, a user equipment transmitting uplink data performs an operation of constituting carrier aggregation including SCell using an unlicensed spectrum S610. The user equipment may constitute carrier aggregation using a plurality of carriers. For example, the user equipment may constitute carrier aggregation including one PCell and at least one Scell. In this case, a part or all of SCell may be constituted using an unlicensed spectrum. That is, the user equipment constitutes carrier aggregation using a cell using a licensed spectrum and a cell using an unlicensed spectrum. Furthermore, each cell constituting a carrier aggregation may be configured to transmit and receive both of a downlink signal and an uplink signal.

In addition, the user equipment performs an operation of receiving downlink control information including subframe allocation information for uplink data transmission in SCell from a base station S620. For example, the user equipment may receive DCI including scheduling information for uplink data transmission in SCell configured to use an unlicensed spectrum. The downlink control information may include subframe allocation information for uplink data transmission. The subframe allocation information may include information indicating an uplink subframe to transmit uplink data by being scheduled through downlink control information.

As one example, subframe allocation information may include offset information indicating a subframe where uplink data starts and duration information indicating the number of subframes transmitting uplink data. The offset information includes information indicating a timing relation between a reception subframe of downlink control information and a transmission subframe of uplink data. In addition, the duration information may include information indicating the number of a plurality of subframes scheduled by downlink control information.

As other example, the subframe allocation information may include information indicating any one of a plurality of subframe allocation sets which constitute offset information indicating a subframe where uplink data starts and duration information indicating the number of subframes transmitting uplink data. That is, the user equipment constitutes a subframe allocation set which has offset information and duration information as factors, the subframe allocation information may include information indicating any one of subframe allocation sets constituted at the user equipment. For this, downlink control information may include an arbitrary field constituted by 5 bits. Each value of the field may correspond each of a plurality of subframe allocation sets.

In addition, the user equipment performs an operation of transmitting uplink data through a plurality of consecutive subframes of Scell based on subframe allocation information S630. For example, the user equipment may check a PUSCH transmission resource scheduling for uplink data transmission using received downlink control information. Especially, when downlink control information is scheduled to transmit uplink data through a plurality of uplink subframes, the user equipment may check a specific subframe information for uplink data transmission by checking offset information and duration information of subframe allocation information. The user equipment may transmit uplink data to a base station through a plurality of consecutive uplink subframes according to a scheduling allocated by downlink control information. In this case, the user equipment may perform a LBT operation for uplink data transmission.

As described above, the user equipment may not perform a LBT operation for uplink data transmission in every subframe, which enhances uplink data transmission efficiency. Specifically, the user equipment checks information of a plurality of consecutive subframes allocated for uplink transmission by using subframe allocation information, and may perform uplink data transmission using this.

Figure 7:
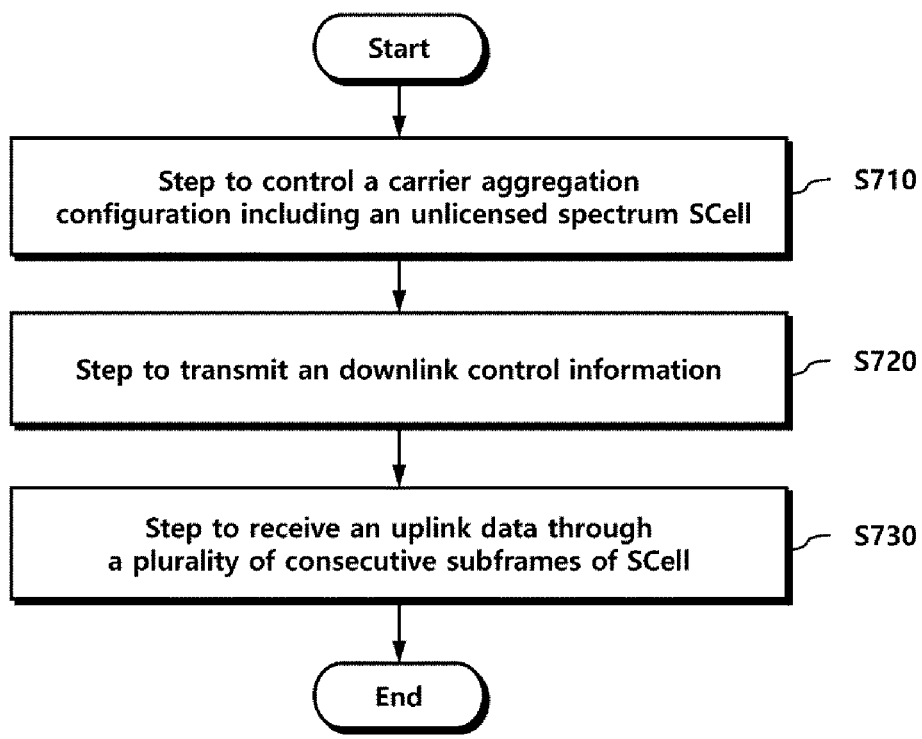
FIG. 7 is a diagram for explaining an operation of a base station according to one embodiment.

FIG. 7 is a diagram for explaining operations of a base station according to one embodiment.

Referring to FIG. 7, a base station receiving uplink data may perform an operation of controlling carrier aggregation configuration including SCell using an unlicensed spectrum of a user equipment S710. For example, the base station generates carrier aggregation configuration information for constituting carrier aggregation to the user equipment, and the base station may transmit the generated carrier aggregation configuration information to the user equipment. The user equipment constitutes carrier aggregation including an unlicensed spectrum cell using the received carrier aggregation configuration information. Besides this, the base station may control whether each SCell constituting carrier aggregation is activated or not as needed, and the base station may control signal transmission and signal reception for carrier aggregation configuration of the user equipment.

In addition, the base station may perform an operation of transmitting downlink control information including subframe allocation information for uplink data transmission in SCell S720. For example, the base station generates downlink control information including scheduling information for uplink data transmission in SCell configured to use an unlicensed spectrum, and the base station may transmit the generated downlink control information to the user equipment. The downlink control information may include subframe allocation information for uplink data transmission. The subframe allocation information, may include information indicating a plurality of uplink subframes to transmit uplink data by being scheduled through downlink control information.

As one example, subframe allocation information may include offset information indicating a subframe where uplink data starts and duration information indicating the number of subframe transmitting uplink data. The offset information includes information indicating timing relation between a reception subframe of downlink control information and a transmission subframe of uplink data. In addition, the duration information may include information indicating the number of a plurality of subframes being scheduled by downlink control information.

As other example, subframe allocation information may include information indicating any one of a plurality of subframe allocation sets which constitute offset information indicating a subframe where uplink data starts and duration information indicating the number of subframe transmitting uplink data. That is, a base station and a user equipment constitute a subframe allocation set having offset information and duration information as a factor in advance, subframe allocation information may include information indicating any one of subframe allocation sets configured to the base station and the user equipment. For this, downlink control information may include an arbitrary field constituted by 5 bits. Each value of the field may correspond to each of the plurality of subframe allocation sets.

In addition, the base station may perform a step to receive uplink data transmitted through a plurality of consecutive subframes of SCell based on subframe allocation information S730. The base station may receive uplink data through a plurality of consecutive subframes indicated by subframe allocation information. A plurality of consecutive uplink subframes mean subframes checked by the user equipment using downlink control information, timing relation and the number of the plurality of consecutive subframes are indicated by subframe allocation information.

Hereinafter, embodiments of subframe allocation information according to the present disclosure are divided and described specifically.

The First Embodiment: A Method for Delivering Subframe Allocation Information as Bitmap Means For transmitting uplink data through a plurality of subframes of SCell using an unlicensed spectrum, allocation information of a subframe where a corresponding PUSCH transmission performs may be included in a bitmap information region of N bits. A base station may transmit allocation information of an uplink subframe for PUSCH transmission to a corresponding user equipment. That is, each of bits constituting a bitmap of a corresponding N bits corresponds to a different subframe each other, and each bit may indicate whether a PUSCH transmission resource is allocated or not in a corresponding subframe.

For example, interpreting a subframe allocation bitmap of downlink control information transmitted in an arbitrary downlink subframe #n, each of bits from MSB to LSB of a corresponding bitmap corresponds to N consecutive subframes from subframe #(n+4), . . . , to subframe #(n+4+N−1), is configured to indicate whether a PUSCH resource is allocated or not in each subframe.

Only, when a corresponding LAA SCell operates based on TDD, a bitmap information constituting N bits for a PUSCH transmission subframe allocation may be configured to correspond to consecutive N subframes from subframe #(n+4)~to subframe #(n+4+N−1) regardless of a type of a corresponding subframe. That is, each of N bits constituting a corresponding bitmap is configured to indicate whether a PUSCH is allocated or not to N subframes from subframe #(n+4)~to subframe #(n+4+N−1) regardless of whether each subframe of N subframes from subframe #(n+4)~to subframe #(n+4+N−1) is UL subframe capable of transmitting a PUSCH, or whether it is DL subframe unable to transmit a PUSCH, or whether it is a special subframe. It is configured to perform a subframe allocation only in UL subframe capable of a PUSCH transmission in real corresponding downlink control information under a control of a base station. Only, when a bitmap of N bits constituting subframe allocation information region of downlink control information is configured to indicate whether consecutive N subframes from subframe #(n+4)~to subframe #(n+4+N−1) is allocated or not regardless of a subframe type like this, if DL unable to transmit a PUSCH or a special subframe is allocated as a PUSCH transmission subframe, a corresponding user equipment may drop a PUSCH transmission in a corresponding subframe. Or, corresponding subframe allocation information overrides a subframe type, and PUSCH transmission in a corresponding subframe may be performed regardless of a type of a corresponding subframe (that is, regardless of whether a corresponding subframe is DL subframe or special subframe).

When a corresponding LAA SCell operates based on TDD, as another method for constituting subframe corresponding to bitmap information constituting N bits for allocating a PUSCH transmission subframe, a bitmap of N bits constituting subframe allocation information region included in downlink control information transmitted through an arbitrary downlink subframe #n corresponds to consecutive N UL subframes among followed subframes including subframe #(n+4) one to one, and may be configured to indicate whether a PUSCH is allocated or not in a corresponding subframe. For example, from MSB to LSB constituting a bitmap of a corresponding N bits are mapped in order to only UL subframes capable of a PUSCH transmission except DL subframe unable to transmit a PUSCH or a special subframe among the followed subframes including subframe #(n+4), through this, it may be indicated whether a PUSCH is allocated or not in each UL subframe.

The Second Embodiment: A Method for Delivering Subframe Allocation Information Including Subframe Offset Information and Duration Information Transmitting uplink data through a plurality of subframes of SCell using an unlicensed spectrum, a base station may transmit subframe offset information indicating a start subframe where a PUSCH transmission starts and duration information for indicating the number of subframes which perform a PUSCH transmission consecutively from the start subframe to a user equipment. For example, downlink control information may include offset information and duration information. Constituting downlink control information, it may be configured information region indicating subframe offset information where a PUSCH transmission resource allocation starts and information region for indicating the number of subframes allocated a PUSCH transmission resource from a corresponding subframe offset. Therefore, it may be allocated k subframe indices which perform a corresponding PUSCH transmission through downlink control information. Only, in this case, k PUSCH transmission subframe allocated through a corresponding multi subframe scheduling may be constituted consecutively in time axis unlike a bitmap means of the first embodiment abovementioned.

As one example, when a downlink subframe index which performs a transmission of a corresponding downlink control information is #n, offset information included in subframe allocation information may include an offset value from subframe #(n+4) considering a minimum processing time of a user equipment. For example, when a offset value transmitted through a corresponding offset information is "o", the first subframe index which performs a transmission of a PUSCH allocated through a corresponding downlink control information may be determined as #(n+4+o). That is, the first uplink subframe scheduled by subframe allocation information may be configured as #n+4+offset information). For example, as FIG. 8, offset information may be constituted L bit information region of downlink control information, and L may be 4. Therefore, offset information may indicate any one value among values from 1 to 15.

In addition, a user equipment may perform a PUSCH transmission through consecutive k subframes from subframe #(n+4+o)~to subframe #(n+4+o+k−1) according to a value of k which is the number of subframes where a PUSCH transmission performs and transmitted through duration information. Or, a user equipment may performs a PUSCH transmission through consecutive k subframes from subframe #(n+4+o)~to subframe #(n+4+o+M) according to a value of k, M may be determined as 0, 1, . . . , k−1.

Meanwhile, a base station may constitute a maximum information indicating a maximum number of a plurality of consecutive subframes of LAA SCell through a high layer to a user equipment in advance. The maximum information may be N value abovementioned. For example, a maximum information N value may be any one of 1, 2, 3 and 4. In addition, a size of information region of duration information may be determined by the maximum information. For example, when a maximum information is 1 or 2, duration information may be constituted as 1 bit information region. If, a maximum information is 3 or 4, duration information may be constituted as 2 bits information region. The cause of this is that duration information needs to indicate any one value smaller than or equal to a maximum information.

As other example of subframe allocation information, when a downlink subframe index which performs a transmission of downlink control information is #n, offset information may include an offset value from subframe #n. For example, when an offset value of offset information is 3, the first subframe index which performs a transmission of a PUSCH allocated through downlink control information may be determined as #(n+3). In addition, when duration information is configured as 4, a user equipment may perform a PUSCH transmission through consecutive 4 subframes from subframe #(n+3)~to subframe #(n+6).

Meanwhile, abovementioned subframe allocation information may constitute offset information and duration information through each information region. Or subframe allocation information may deliver offset information and duration information through one field to a user equipment.

For example, when a plurality of subframe allocation sets having offset information and duration information as factors are constituted at a user equipment and a base station, subframe allocation information may include information indicating any one of subframe allocation sets. That is, offset information and duration information may be signaled through one information region (for example, subframe index allocation information field) by joint coding means, don't be signaled through a different information region each other by separate coding means. Here, a plurality of subframe allocation sets may be constituted to a user equipment by a base station in advance, or a plurality of subframe allocation sets may be constituted to a user equipment and a base station in advance.

FIG. 9 is a diagram illustrating one example of a subframe allocation set.

Referring to FIG. 9, a subframe allocation set is configured by grouping subframe offset information and duration information, and the subframe allocation set is mapped to subframe allocation information for indicating the subframe allocation set. For example, as FIG. 9, when subframe allocation information is configured as 3 bits, the subframe allocation information may indicate total 8 subframe allocation sets. Each subframe allocation set may be grouped by mapping offset information and duration information. Specifically, when a value of subframe allocation information is configured as 2, subframe offset information may be configured as 1 and duration information may be configured as 3. A user equipment may check a start location and the number of uplink subframe allocated using offset information and duration information. Or, subframe allocation information may be constituted as 5 bits.

Figure 10:
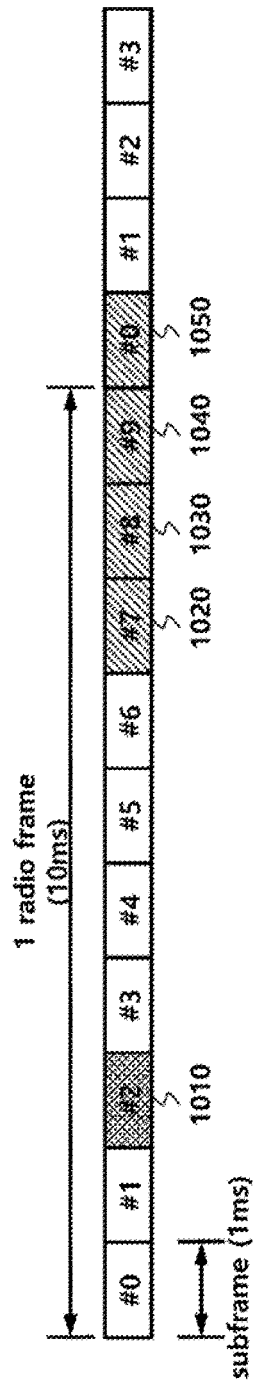
FIG. 10 is a diagram for explaining a timing for a user equipment to transmit uplink data using subframe allocation information according to one embodiment uplink data subframe allocation information.

FIG. 10 is a diagram for explaining a timing for transmitting uplink data using subframe allocation information by a user equipment according to one embodiment.

Hereinafter, a procedure of determining an uplink subframe according to subframe allocation information will be described. A base station may transmit downlink control information including subframe allocation information in subframe #2(1010). A user equipment checks the downlink control information received in 1010 subframe, and the user equipment may check a value of subframe allocation information. For example, when offset information included in subframe allocation information is constituted like FIG. 8, a user equipment acquires offset information and duration information included in downlink control information. If offset information indicates 1 and if duration information is indicated as 4, a user equipment may determine the first subframe transmitting uplink data according to subframe #(n+4+o+P). Here, n is a subframe index number received downlink control information including subframe allocation information, o is a value of offset information, P is a value determined by interlocking with duration information configured as 0, 1, . . . , k−1. Therefore, a user equipment may check that four subframes from subframe #7(1020) to subframe #0(1050) of next radio frame are scheduled for uplink data transmission.

Meanwhile, as described in the first embodiment, when LAA SCell is operating based on TDD, DL subframe unable to transmit a PUSCH or a special subframe may be included in consecutive k subframes from a start subframe according to offset information. In this case, a user equipment may drop PUSCH transmission in a subframe unable to transmit a PUSCH, or override a type of a subframe and perform PUSCH transmission in a subframe regardless of a type of a subframe (that is, regardless of whether a subframe is DL subframe or a special subframe). Or, by limiting k subframes being constituted from a start subframe according to the offset information to only UL subframe, when there exists a subframe type which is unable to transmit a PUSCH such as DL or a special subframe in the middle, may transmit a PUSCH through consecutive k UL subframes by means of postponing a PUSCH transmission in the subframes and transmitting a PUSCH through followed UL subframes. That is, offset information and duration information may be applied by counting an only subframe capable of transmitting uplink.

The present embodiments described above relates to a method for allocating k subframes for PUSCH transmission through downlink control information defined for multi subframe scheduling. The embodiments may be applied to all of methods for scheduling uplink data transmission of an unlicensed spectrum cell through downlink control information.

Through the operations described above, a user equipment doesn't perform a LBT operation for uplink data transmission in every subframe, and this enhances an efficiency of uplink data transmission. Specifically, a user equipment checks information of a plurality of consecutive subframe allocated for an uplink transmission using subframe allocation information, and the user equipment may perform uplink data transmission using this.

Hereinafter, a user equipment and a base station according to embodiments of the present disclosure with reference to accompanying drawings.

Figure 11:
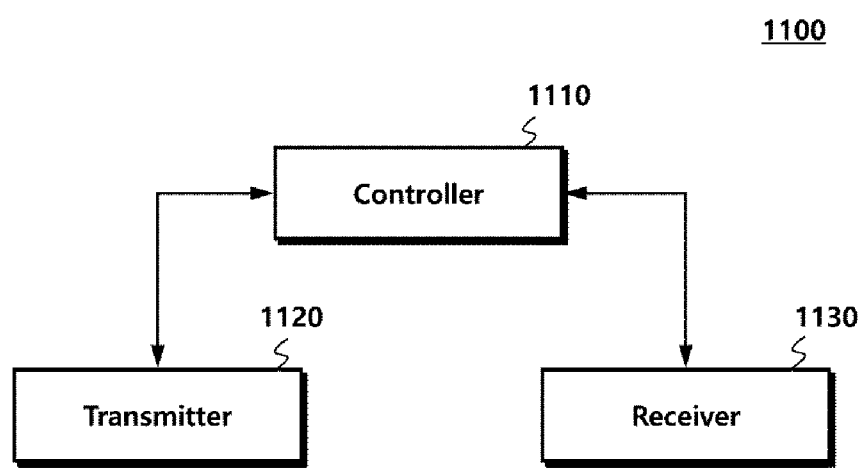
FIG. 11 is a diagram illustrating a user equipment according to one embodiment.

FIG. 11 is a diagram illustrating a user equipment according to one embodiment.

Referring to FIG. 11, a user equipment 1100 transmitting uplink data may include a controller 1110 configured to constitute a carrier aggregation including SCell using an unlicensed spectrum, a receiver 1130 configured to receive downlink control information including subframe allocation information for uplink data transmission in SCell from a base station, and a transmitter 1120 configured to transmit uplink data through a plurality of consecutive subframes of SCell based on subframe allocation information.

The controller 1110 may constitute carrier aggregation using a plurality of carriers. For example, the controller 1110 may constitute a carrier aggregation including one PCell and one more SCell. In this case, a part or whole of SCell may be constituted to use an unlicensed spectrum. That is, the controller 1110 constitutes carrier aggregation using a cell which is using a licensed spectrum and a cell which is using an unlicensed spectrum. Furthermore, each cell constituting carrier aggregation may be configured to transmit and receive both of a downlink signal and an uplink signal. In addition, the controller 1110 controls overall operations of a user equipment 1100 to specify a subframe where a PUSCH transmission performs based on subframe allocation information received from a base station.

The receiver 1130 may receive downlink control information including scheduling information for uplink data transmission in SCell configured to use an unlicensed spectrum. The downlink control information may include subframe allocation information for uplink data transmission. The subframe allocation information, may include information indicating an uplink subframe to transmit uplink data by being scheduled through downlink control information.

As one example, subframe allocation information may include offset information indicating a subframe where uplink data starts and duration information indicating the number of subframe transmitting uplink data. The offset information includes information indicating timing relation between a reception subframe of downlink control information and a transmission subframe of uplink data. In addition, the duration information may include information indicating the number of a plurality of subframes scheduled by downlink control information. The offset information and the duration information may be constituted through a separate information region, a size of information region of the duration information may be determined by a maximum information which is the number of maximum subframe being constituted to a user equipment through a high layer signaling.

As other example, subframe allocation information may include information indicating any one of a plurality of subframe allocation sets which constitute offset information indicating a subframe where uplink data starts and duration information indicating the number of subframe transmitting uplink data. That is, a user equipment constitutes a subframe allocation set having offset information and duration information as factors, subframe allocation information may include information indicating any one of subframe allocation sets constituted to a user equipment. For this, downlink control information may include an arbitrary field constituted as 5 bits. Each value of the field may correspond to each of a plurality of subframe allocation sets.

Besides, the receiver 1110 receives downlink control information, data, message through a corresponding channel from a base station. In addition, the receiver 1110 may receive a maximum information indicating the maximum number of a plurality of consecutive subframes of SCell through high layer signaling from a base station.

In addition, the transmitter 1120 may transmit uplink data to a base station through a plurality of consecutive uplink subframes according to scheduling allocated by downlink control information, when checks a PUSCH transmission resource scheduling for uplink data transmission using a received downlink control information. In this case, the transmitter 1120 may perform a LBT operation for uplink data transmission. Besides, the transmitter 1120 transmits an uplink control information, data, message through a corresponding channel to a base station.

Figure 12:
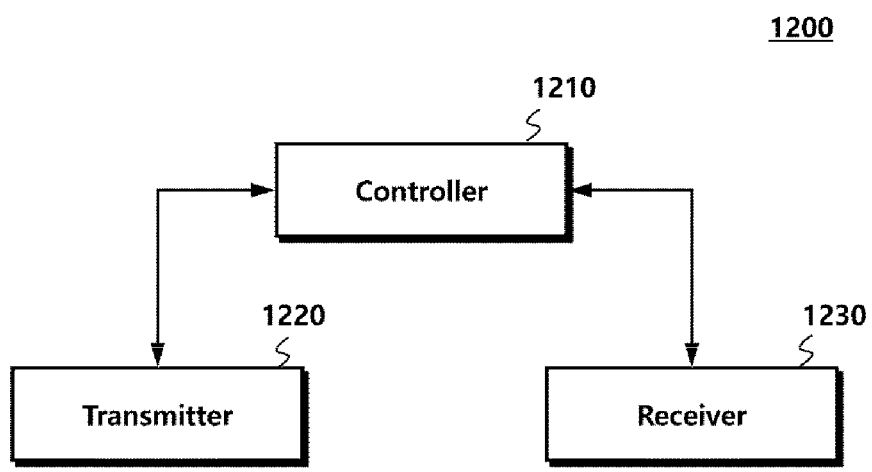
FIG. 12 is a diagram illustrating base station according to one embodiment.

FIG. 12 is a diagram illustrating a base station according to one embodiment.

Referring to FIG. 12, the base station 1200 receiving uplink data may include a controller 1210 configured to control carrier aggregation configuration including SCell using an unlicensed spectrum, a transmitter 1220 configured to transmit downlink control information including subframe allocation information for uplink data transmission in SCell, and a receiver 1230 configured to receive uplink data transmitted through a plurality of consecutive subframes of SCell based on subframe allocation information.

The transmitter 1220 may transmit carrier aggregation configuration information for constituting carrier aggregation to a user equipment. A user equipment constitutes carrier aggregation including an unlicensed spectrum using received carrier aggregation configuration information.

The controller 1210 may control whether each SCell constituting carrier aggregation activates or not as needed, may control transmission and reception of a signal for a carrier aggregation configuration of a user equipment.

In addition, the controller 1210, receiving uplink data through an unlicensed spectrum SCell, controls overall operations of the base station 1200 to generate subframe allocation information for scheduling a subframe to receive uplink data and deliver it.

The transmitter 1220 may transmit maximum information indicating a maximum number of a plurality of consecutive subframes of SCell through a high layer signaling to a user equipment.

Besides, the transmitter 1220 and the receiver 1230 are used to transmit and receive a necessary signal, message, data to perform the present embodiments with a user equipment.

Standard contents or standard documents mentioned in the above embodiment are omitted to simplify the description of the specification and constitute a part of the present specification. Therefore, it should be understood that adding some of the above standard contents and standard documents to the present specification or describing the same in claims are within the scope of the present disclosure.

Although a preferred embodiment of the present disclosure has been described for illustrative purposes, those skilled in the art will appreciate that various modifications, additions, and substitutions are possible without departing from the scope and spirit of the embodiments of the present disclosure as disclosed in the accompanying claims. Therefore, exemplary aspects of the present disclosure have not been described for limiting purposes. The scope of the present disclosure shall be construed based on the accompanying claims in such a manner that all the technical ideas included within the scope equivalent to the claims belong to the present disclosure.

What is claimed is:

1. A method for transmitting uplink data by a user equipment, the method comprising:
    configuring carrier aggregation including a secondary cell which is using an unlicensed spectrum;
    receiving, by the user equipment, downlink control information including subframe allocation information for transmitting uplink data in the secondary cell, from a base station; and
    transmitting the uplink data through a plurality of consecutive subframes of the secondary cell based on the subframe allocation information,
    wherein the subframe allocation information comprises i) offset information for determination of a subframe in which the uplink data starts to be transmitted and ii) duration information indicating the number of subframes in which the uplink data is transmitted.

2. The method of claim 1, wherein the subframe in which the uplink data starts to be transmitted is determined as n+4+the offset information, when a subframe number in which the downlink control information is received is n, where n is an integer number greater than 0.

3. The method of claim 1, further comprising:
    receiving maximum information indicating the largest number of the plurality of consecutive subframes of the secondary cell through a high layer signaling before receiving the downlink control information.

4. The method of claim 3, wherein a size of information area of the duration information is determined by the maximum information.

5. A method for receiving uplink data by a base station, the method comprising:
    controlling carrier aggregation configuration of a user equipment including a secondary cell which is using an unlicensed spectrum;
    transmitting, by the base station to the user equipment, downlink control information including subframe allocation information for transmitting uplink data in the secondary cell; and
    receiving the uplink data transmitted through a plurality of consecutive subframes of the secondary cell based on the subframe allocation information,
    wherein the subframe allocation information comprises i) offset information for determination of a subframe in which the uplink data starts to be transmitted and ii) duration information indicating the number of subframes in which the uplink data is transmitted.

6. The method of claim 5, wherein the subframe in which the uplink data starts to be transmitted is determined as n+4+the offset information, when a subframe number in which the downlink control information is received is n, where n is an integer number greater than 0.

7. The method of claim 5, further comprising:
    transmitting maximum information indicating the largest number of the plurality of consecutive subframes of the secondary cell through a high layer signaling to the user equipment before transmitting the downlink control information.

8. The method of claim 7, wherein a size of information area of the duration information is determined by the maximum information.

9. A user equipment for transmitting uplink data, the user equipment comprising:
    a controller configured to configure carrier aggregation including a secondary cell which is using an unlicensed spectrum;
    a receiver configured to receive downlink control information including subframe allocation information for transmitting a uplink data in the secondary cell, from a base station; and
    a transmitter configured to transmit the uplink data through a plurality of consecutive subframes of the secondary cell based on the subframe allocation information,
    wherein the subframe allocation information comprises i) offset information for determination of a subframe in which the uplink data starts to be transmitted and ii) duration information indicating the number of subframes in which the uplink data is transmitted.

10. The user equipment of claim 9, wherein the subframe in which the uplink data starts to be transmitted is determined as n+4+the offset information, when a subframe number in which the downlink control information is received is n, where n is an integer number greater than 0.

11. The user equipment of claim 9, wherein the receiver receives maximum information indicating the largest number of the plurality of consecutive subframes of the secondary cell through a high layer signaling.

12. The user equipment of claim 11, wherein a size of information area of the duration information is determined by the maximum information.

* * * * *

UNITED STATES PATENT AND TRADEMARK OFFICE
CERTIFICATE OF CORRECTION

PATENT NO. : 10,412,731 B2
APPLICATION NO. : 15/497362
DATED : September 10, 2019
INVENTOR(S) : Kyujin Park et al.

Page 1 of 1

It is certified that error appears in the above-identified patent and that said Letters Patent is hereby corrected as shown below:

On the Title Page

Item (30) Foreign Application Priority Data section should be added under item (65) Prior Publication Data section as follows:
--(30) Foreign Application Priority Data
Apr. 27, 2016 (KR) ............ 10-2016-0051737
Dec. 15, 2016 (KR) ............ 10-2016-0171232--

Signed and Sealed this
Twenty-first Day of January, 2020

Andrei Iancu
*Director of the United States Patent and Trademark Office*